(12) United States Patent
Chen et al.

(10) Patent No.: US 9,274,986 B2
(45) Date of Patent: Mar. 1, 2016

(54) DATA TRANSMISSION CIRCUIT AND DATA TRANSMISSION METHOD USING CONFIGURABLE THRESHOLD AND RELATED UNIVERSAL SERIAL BUS SYSTEM

(71) Applicant: Realtek Semiconductor Corp., HsinChu (TW)

(72) Inventors: Lin-Hung Chen, Hsinchu (TW); Tao-Chun Wang, Taipei (TW); Yu-Kai Yen, Kaohsiung (TW); Hung-Tai Chen, Chiayi County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 14/059,461

(22) Filed: Oct. 22, 2013

(65) Prior Publication Data

US 2014/0258567 A1    Sep. 11, 2014

(30) Foreign Application Priority Data

Mar. 6, 2013   (TW) .............................. 102107879 A

(51) Int. Cl.
*G06F 13/28* (2006.01)
*H04N 1/00* (2006.01)
*G06F 12/08* (2006.01)

(52) U.S. Cl.
CPC ............ *G06F 13/28* (2013.01); *G06F 12/0879* (2013.01); *H04N 1/0096* (2013.01); *H04N 1/00954* (2013.01)

(58) Field of Classification Search
CPC ... G06F 13/28; G06F 12/0879; H04N 1/0096; H04N 1/00954
USPC .......................................................... 710/22
See application file for complete search history.

(56) References Cited

U.S. PATENT DOCUMENTS

| 2010/0275037 | A1* | 10/2010 | Lee et al. ....................... 713/189 |
| 2011/0035545 | A1 | 2/2011 | Sutardja |
| 2012/0017016 | A1* | 1/2012 | Ma et al. ........................ 710/110 |

FOREIGN PATENT DOCUMENTS

| TW | 200634528 | 10/2006 |
| TW | I277875 | 4/2007 |
| TW | 201017423 | 5/2010 |

* cited by examiner

*Primary Examiner* — Ernest Unelus
(74) *Attorney, Agent, or Firm* — Winston Hsu; Scott Margo

(57) ABSTRACT

A data transmission circuit applied to a universal serial bus (USB) system includes a memory, a direct memory access (DMA) engine and a USB controller. The memory is arranged for receiving and storing external data. The DMA engine is coupled to the memory, and arranged for controlling data retrieved from the memory. The USB controller is coupled to the DMA engine, and arranged for receiving data from the DMA engine and for transmitting the received data to a host. When the memory the stored data volume reaches a first threshold, the DMA engine starts continuously fetching data from the memory and transmitting it to the USB controller, until the data volume fetched by the DMA engine reaches a second threshold, or there is no data left in the memory. The second threshold is greater than the first threshold.

14 Claims, 4 Drawing Sheets

DATA TRANSMISSION CIRCUIT AND DATA TRANSMISSION METHOD USING CONFIGURABLE THRESHOLD AND RELATED UNIVERSAL SERIAL BUS SYSTEM

BACKGROUND OF THE INVENTION

1. Field of the Invention

The disclosed embodiments of the present invention relate to data transmission, and more particularly, to a data transmission circuit and a data transmission method using a configurable threshold and a related universal serial bus system.

2. Description of the Prior Art

In a general universal serial bus (USB) system, if a user wants to move data in a memory of a peripheral element to a host via a USB transmission line, an aggregation method is employed to reduce the number of moving operations of the data, so as to lower the utilization of a central processing unit (CPU) of a host and accordingly decrease the loading of the CPU.

In accordance with the conventional aggregation transmission method, it is required to assign a fixed threshold to the memory of the peripheral element. When data volume in the memory reaches the fixed threshold, the peripheral element starts moving data from the memory to the host. Please refer to FIG. 1, which is a schematic diagram illustrating a threshold of a memory 110 and each transmission data. As shown in FIG. 1, when the memory 110 is configured to have a lower threshold, the size of each transmission data (#1~#N+1) would be smaller (i.e., data volume maintains roughly at the same level of the threshold), and the utilization of the CPU would be higher (i.e., the loading of the CPU is heavier). However, at this moment, the memory 110 may have more buffering capacity to accommodate incoming data. On the other hand, when the memory 110 is configured to have a higher threshold, the size of each transmission data (#1~#M) would be larger, and the utilization of the CPU would be lower (i.e., the loading of the CPU is lighter). However, at this moment, the buffering capacity of the memory 110 would be relatively insufficient.

To sum up, since there is a conflict between the utilization of the CPU and the buffering capacity of the memory of the peripheral element, a system designer has to take both factors into account and balance the trade-offs. In other words, the conventional design fails to achieve optimized CPU utilization as well as optimized memory buffering capacity.

SUMMARY OF THE INVENTION

In accordance with exemplary embodiments of the present invention, a data transmission circuit and a data transmission method using a configurable threshold and a related universal serial bus system are proposed to solve the above-mentioned problem. The data transmission method and the data transmission circuit are applied to the related universal serial bus system and have the advantages such as low processor utilization, high memory buffering capacity, and easy hardware implementation.

According to a first aspect of the present invention, an exemplary data transmission circuit is disclosed. The exemplary data transmission circuit is applied to a universal serial bus (USB) system and includes a memory, a direct memory access (DMA) engine and a USB controller. The memory is arranged for receiving and storing external data. The DMA engine is coupled to the memory, and arranged for controlling data retrieved from the memory. The USB controller is coupled to the DMA engine, and arranged for receiving data from the DMA engine and for transmitting the received data to a host. When the memory the stored data volume reaches a first threshold, the DMA engine starts continuously fetching data from the memory and transmitting it to the USB controller, until the data volume fetched by the DMA engine reaches a second threshold, or there is no data left in the memory. The second threshold is greater than the first threshold.

According to a second aspect of the present invention, an exemplary data transmission method is disclosed. The exemplary data transmission method is applied to a USB system and includes steps: providing a memory, arranged for receiving and storing external data; providing a USB controller; when the stored data volume in the memory reaches a first threshold, starting continuously fetching data from the memory, and transmitting the fetched data to the USB controller, until the fetched data volume reaches a second threshold, or there is no data left in the memory. The second threshold is greater than the first threshold.

According to a third aspect of the present invention, an exemplary USB system is disclosed. The exemplary USB system includes a host and a peripheral element. The host includes a processor, a system memory and a first USB controller. The system memory is coupled to the processor. The first USB controller is coupled to the system memory. The peripheral element is coupled to the host via a USB transmission medium and includes a memory, a DMA engine and a second USB controller. The memory is arranged for receiving and storing external data. The DMA engine is coupled to the memory, and arranged for controlling data retrieved from the memory. The second USB controller is coupled to the DMA engine, and arranged for receiving data from the DMA engine and for transmitting the received data to the host. When the memory the stored data volume reaches a first threshold, the DMA engine starts continuously fetching data from the memory and transmitting it to the second USB controller, until the data volume fetched by the DMA engine reaches a second threshold, or there is no data left in the memory. The second threshold is greater than the first threshold.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to." Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
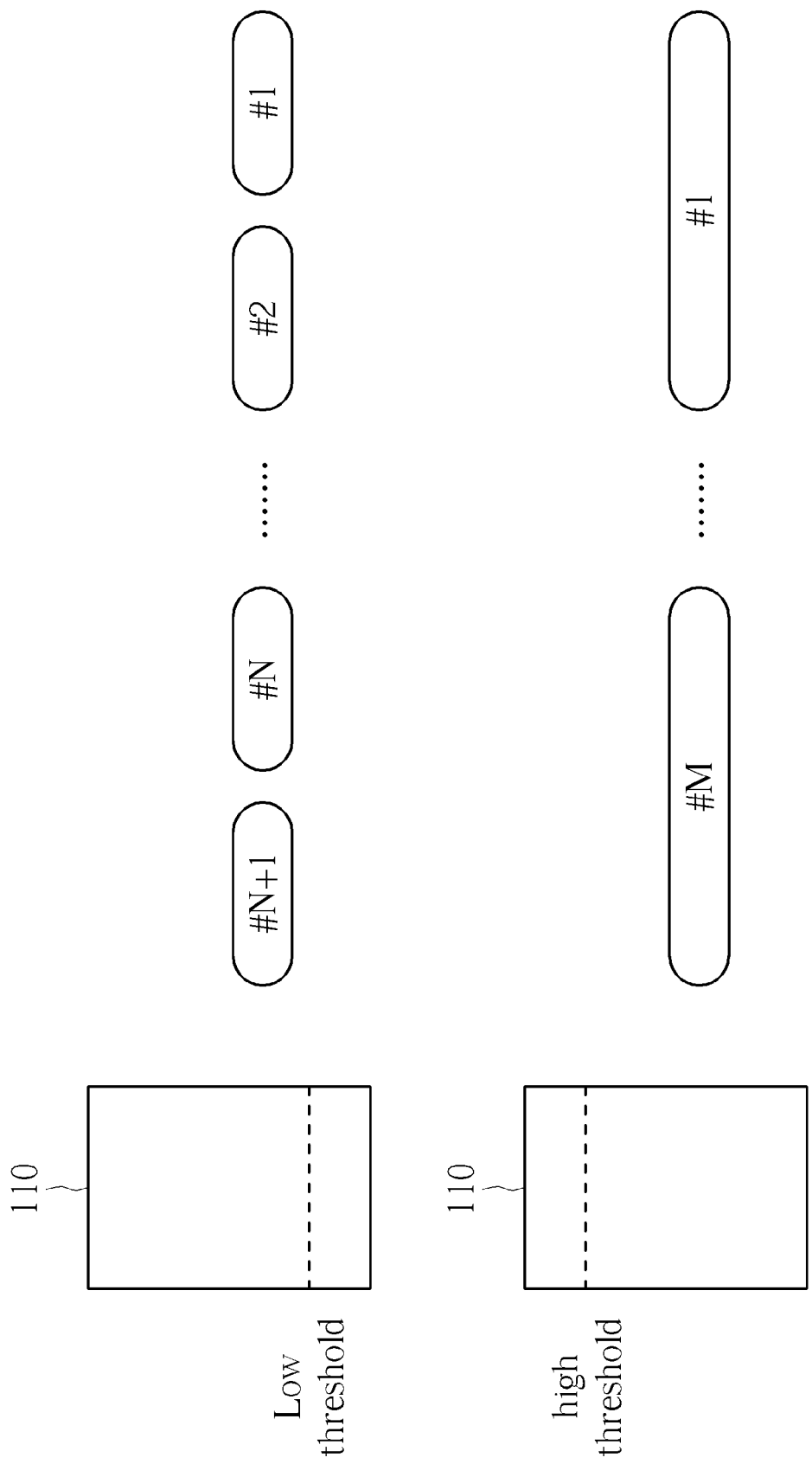
FIG. 1 is a schematic diagram illustrating a threshold of a memory and each transmission data according to the prior art.
Figure 2:
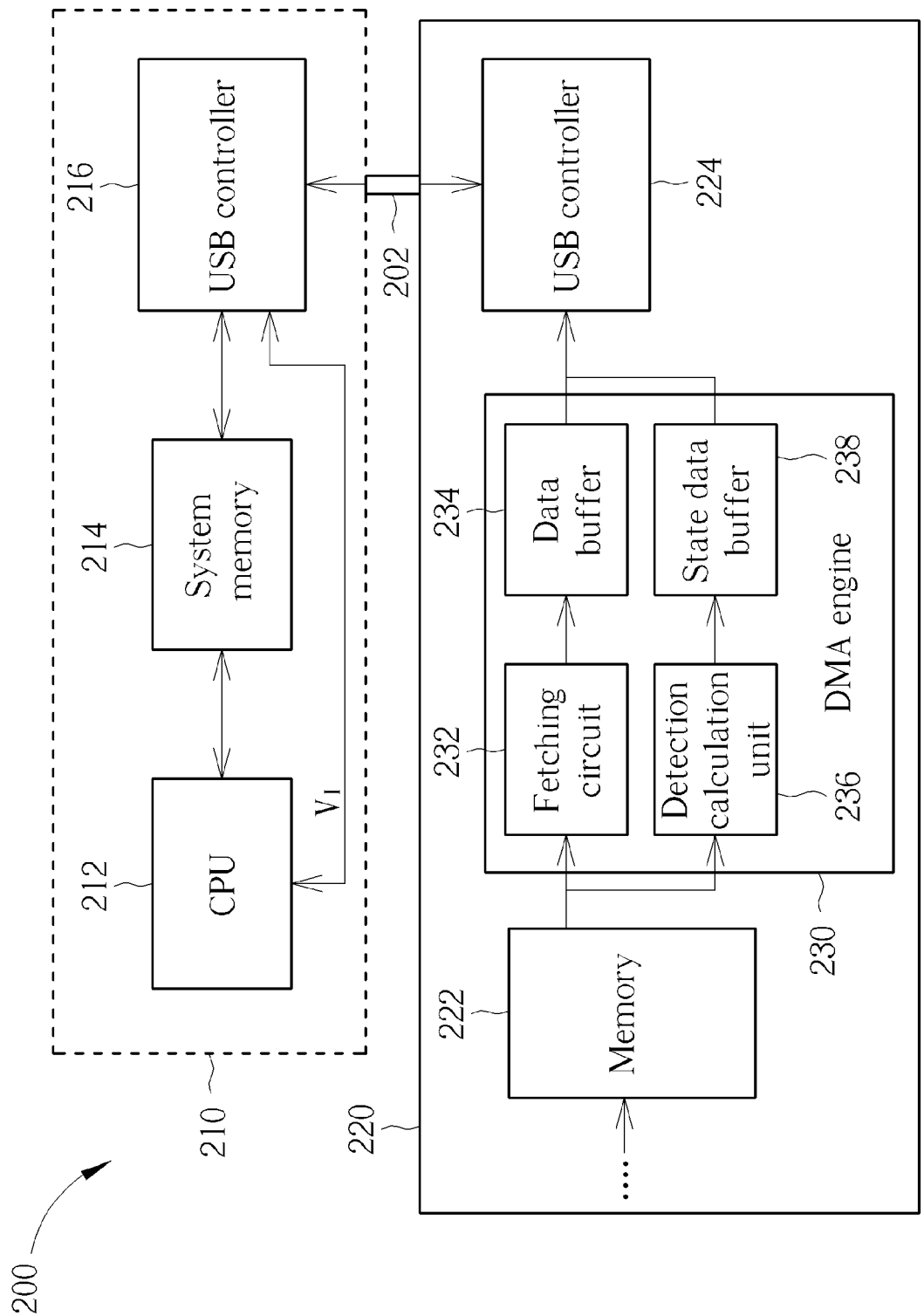
FIG. 2 is a schematic diagram illustrating a universal serial bus system according to an embodiment of the present invention.

Please refer to FIG. 2, which is a schematic diagram illustrating a universal serial bus (USB) system 200 according to an embodiment of the present invention. As shown in FIG. 2, the USB system 200 includes a host 210 and a peripheral element 220, both connected to each other via a USB transmission medium 202 (e.g., a USB transmission line or a USB interface transmission circuit). The host 210 includes a CPU 212, a system memory 214 and a USB controller 216, and the peripheral element 220 includes a memory 222, a direct memory access (DMA) engine 230 and a USB controller 224. In this embodiment, the memory 222 may be a first-in first-out (FIFO) memory. The DMA engine 230 includes a fetching circuit 232, a data buffer 234, a detection calculation unit 236 and a state data buffer 238. In addition, in this embodiment, the memory 222 is arranged for storing input packet data from a source outside the peripheral element 220, and the memory 222 is configured to have a first threshold. When data volume of stored data in the memory 222 reaches the first threshold, the memory 222 starts transmitting the stored packet data to the DMA engine 230, sequentially.

In this embodiment, a transmission bandwidth between the memory 222 and the DMA engine 230 is less than a transmission bandwidth between the USB controller 224 and the host 210.

In this embodiment, the peripheral element 220 may be a wired network adapter, but it is not meant to be a limitation of the present invention. As long as the peripheral element 220 uses the USB system 200 to transmit the received packet data to the host 210 sequentially, the peripheral element 220 may be any device.

Figure 3:
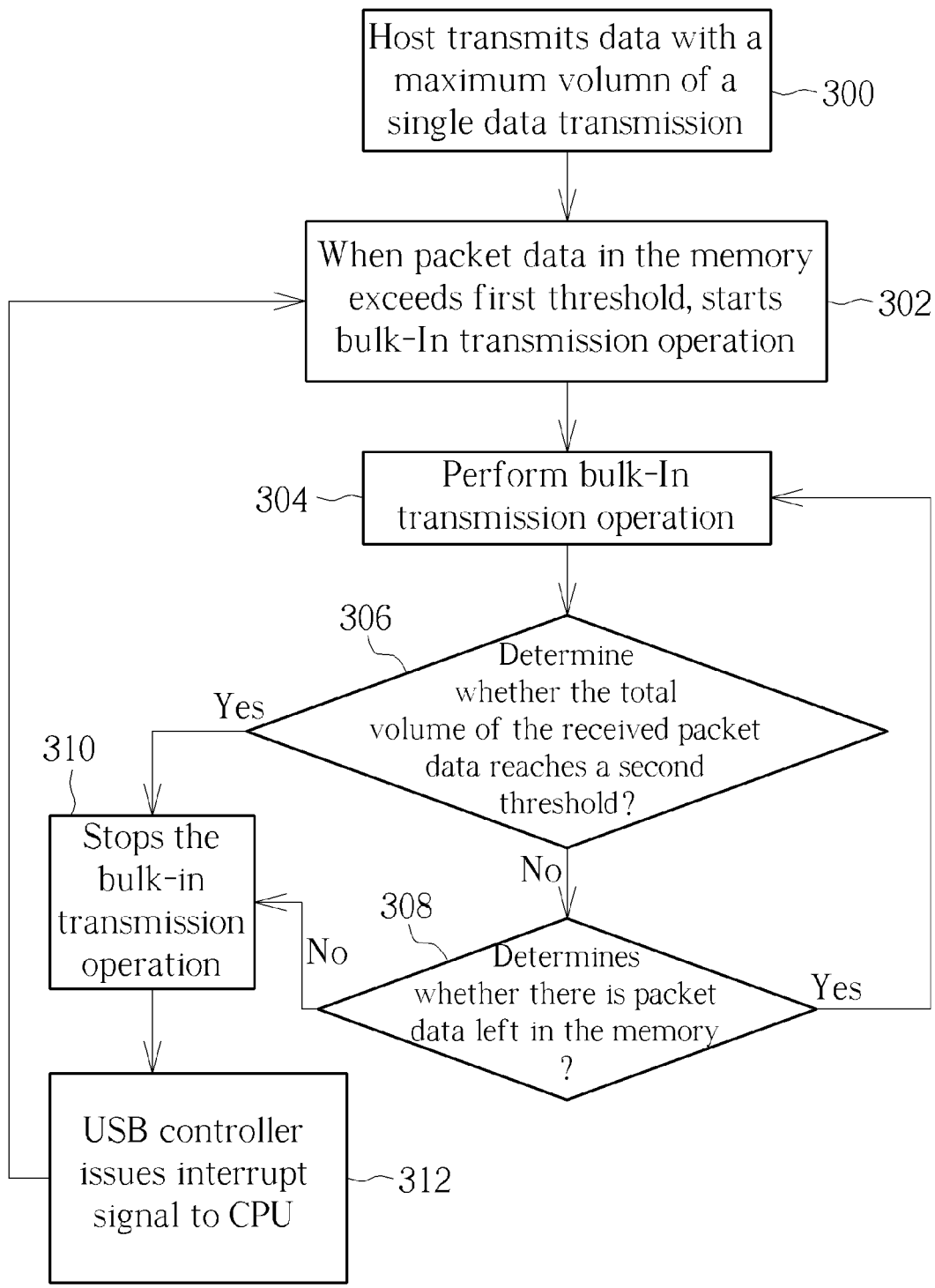
FIG. 3 is a flowchart illustrating a data transmission method according to an embodiment of the present invention.

Please concurrently refer to FIG. 2 and FIG. 3. FIG. 3 is a flowchart illustrating a data transmission method according to an embodiment of the present invention. Referring to FIG. 3, the process is detailed as follows.

First, in step 300, when the USB system 200 is booting up or ready to start operating, the host 210 transmits data with a maximum volume of a single data transmission to DMA engine 230. The maximum volume of the single data transmission is a data transmission volume that is regulated in the USB specification to specify a data transmission volume that can be received and processed by the host 210 in a single transmission. In step 302, when the packet data stored in the memory 222 exceeds the first threshold, the DMA engine 230 starts a bulk-In transmission operation. At this moment, the fetching circuit 232 is about to start fetching the packet data from the memory 222. Next, in step 304, the DMA engine 230 continues to perform the bulk-In transmission operation, and the fetching circuit 232 keeps fetching the packet data from memory 222. The fetching circuit 232 first transmits the fetched packet data to the data buffer 234, and then the fetched packet data is transmitted to the system memory 214 via the USB controller 224, the USB transmission medium 202 and the USB controller 216. In addition, the detection calculation unit 236 also keeps a record of the total volume of packet data received by the DMA engine 230 from the memory 222.

Next, in step 306, the detection calculation unit 236 determines whether the total volume of the received packet data reaches a second threshold. If the total volume of the received packet data has not yet reached the second threshold, the process enters step 308. On the contrary, if the total volume of the received packet data has reached the second threshold, the process enters step 310. In addition, in this embodiment, the second threshold is determined according to the maximum single data transmission volume. For example, the second threshold may be configured slightly less than the maximum single data transmission volume.

In step 308, the detection calculation unit 236 determines whether there is packet data left in the memory 222 by checking whether there is data continuously received from memory 222. If there is still packet data left in the memory 222, the process goes back to step 304 to perform the bulk-in transmission operation. If there is no packet data left in the memory 222, and the detection calculation unit 236 has not received data from the memory 222 after a predetermined period of time, the process enters step 310.

In step 310, the DMA engine 230 stops the bulk-in transmission operation, and the detection calculation unit 236 first transmits a short packet to the state data buffer 238, and then the short packet is transmitted to the USB controller 216 via the USB controller 224 and the USB transmission medium 202. The short packet includes packet data whose packet size is smaller than a normal packet size specified in the USB specification, and the short packet is arranged to be appended to the end of each transmission data such that the host 210 can recognize where each transmission data ends. In addition, before the DMA engine 230 is going to shut down the bulk-in transmission operation, if the DMA engine 230 is receiving a packet data from the memory 222, the DMA engine 230 would wait until it finishes receiving this packet data and then shut down the bulk-in transmission operation.

In step 312, when the USB controller 216 detects the presence of a short packet, the USB controller 216 knows this transmission data has ended, and then issues an interrupt signal $V_I$ to the CPU 212 to notify the CPU 212 to start reading and processing this data which is stored in the system memory 214. Next, the process goes back step 302 to prepare for the next data transmission, and the detection calculation unit 236 resets the total data volume received by the DMA engine 230 to zero and restarts a calculation of the next total received data volume.

Figure 4:
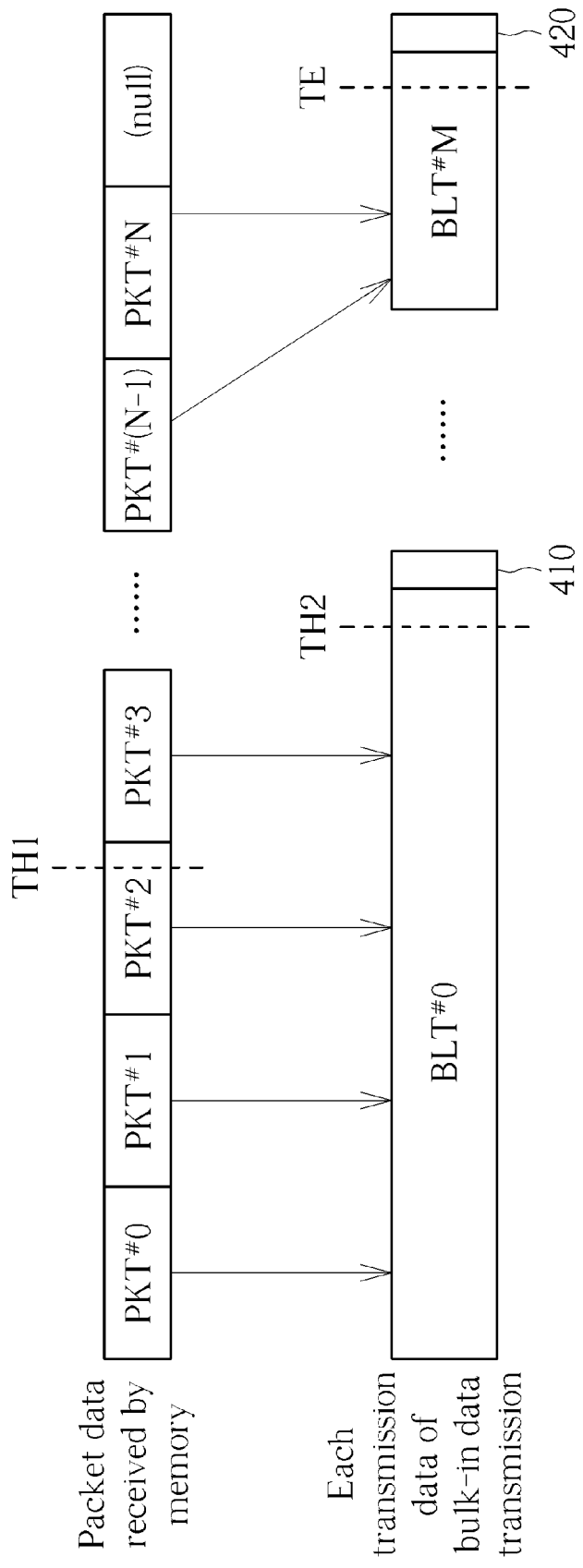
FIG. 4 is a schematic diagram illustrating operations described in a process shown in FIG. 3.

Please refer to FIG. 4, which is a schematic diagram illustrating operations of the process shown in FIG. 3. As shown in FIG. 4, assuming that the memory 222 orderly receives and stores N packets PKT#0-PKT#N, and there is no other packet entering the memory 222 after the packet PKT#N, when the memory 222 receives the packet PKT#2, data volume stored in the memory 222 exceeds the first threshold TH1, and the DMA engine 230 starts performing a bulk-in transmission operation. The DMA engine 230 makes the packets, including PKT#0, PKT#1, PKT#2, etc., as a first bulk-in transmission data BLT#0 and transmits the first bulk-in transmission data BLT#0 to the USB controller 224. When data volume of the first bulk-in transmission data BLT#0 exceeds the second threshold TH2, the DMA engine 230 stops the bulk-in transmission operation, and appends a short packet 410 to the end of the first bulk-in transmission data BLT#0 such that the USB controller 216 of the host 210 recognizes where the first bulk-in transmission data BLT#0 ends, and accordingly transmits an interrupt signal $V_I$ to the CPU 212. Next, the DMA engine 230 continues to perform similar operations as mentioned above, until the DMA engine 230 starts a bulk-in transmission data BLT#M, where there is no other packet after the packet PKT#N (i.e., there is no data left in the memory 222). Although data volume of the bulk-in transmission data BLT#M has not yet reached the second threshold TH2, the DMA engine 230 appends a short packet 420 to the end of the bulk-in transmission data BLT#M after waiting a predetermined period of time TE, such that the USB controller 216 of the host 210 can recognize this and accordingly transmit an interrupt signal to the CPU 212.

Another example is used here to describe operations of the apparatus shown in FIG. 2 and the method shown in FIG. 3. Assume that the capacity of the memory 222 is 64 KB (kilobyte), the capacity of the data buffer 234 is 4 KB, the first threshold is 4 KB, the second threshold is 32 KB, and the packet data for transmission is 32 KB. If the prior art method is employed, it would require 8 transmission operations to transfer the packet data (32 KB/4 KB=8) to the host (each transmitted data volume is about 4 KB), and the host needs to receive 8 interrupt signals to process the packet data, and thus has higher utilization and heavier loading. However, when the method proposed by the present invention is employed, it would only need one transmission operation to transfer the packet data to the host (the transmitted data volume is about 32 KB), and the host would only receive one interrupt signal to process the packet data, and thus has lower utilization and lighter loading. In addition, since the transmission bandwidth between the memory 222 and the DMA engine 230 is less than the transmission bandwidth between the USB controller 224 and the host 210, there will be no traffic jams occurring in the procedure of continuously transmitting the packet data from the memory 222 to the system memory 214 of the host 210.

As mentioned above, since the DMA engine 230 of the present invention may continuously transmit packet data from memory 222 to the host 210 until the data volume of each transmission data reaches the second threshold. Therefore, a designer may set the first threshold in the memory 222 by a lower value, such that the memory 222 may have more buffering capacity; in addition, since the volume of each transmission data is about the second threshold (i.e., approximate the maximum single data transmission volume of the host 210), the CPU 212 would receive fewer interrupt signals and thus have lower loading. Therefore, the present invention may bring out the optimized utilization of the CPU 212 as well as optimized buffering capacity of the memory 222, without the need to balance trade-offs like the prior art design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission circuit applied to a universal serial bus (USB) system, comprising:
a memory, arranged for receiving and storing external data;
a direct memory access (DMA) engine, coupled to the memory and arranged for controlling data retrieved from the memory; and
a USB controller, coupled to the DMA engine, the USB controller arranged for receiving data from the DMA engine and for transmitting the received data to a host;
wherein the DMA engine starts to fetch data from the memory when a data volume of stored data in the memory changes from a first value to a first threshold while in the memory, transmits fetched data to the USB controller until a data volume of the fetched data reaches a second threshold or no data left in the memory, and the first value is lower than the first threshold, and the second threshold is greater than the first threshold;
wherein a transmission bandwidth between the memory and the DMA engine is less than a transmission bandwidth between the USB controller and the host.

2. The data transmission circuit of claim 1, wherein the second threshold is determined according to a maximum volume of a single data transmission that is provided by the host.

3. The data transmission circuit of claim 1, wherein when the data volume of the fetched data fetched by the DMA engine from the memory is greater than the second threshold, the DMA engine stops transmitting the fetched data from the memory to the USB controller, and transmits a short packet to the USB controller.

4. The data transmission circuit of claim 1, wherein when the DMA engine determines that there is no data left in the memory, the DMA engine transmits a short packet to the USB controller.

5. The data transmission circuit of claim 1, wherein the data transmission circuit is applied to a network adaptor.

6. A data transmission method applied to a universal serial bus (USB) system, comprising:
providing a memory arranged for receiving and storing external data;
providing a USB controller;
starting to fetch data from the memory when a data volume of stored data in the memory changes from a first value to a first threshold while in the memory, and transmitting fetched data to the USB controller until a data volume of the fetched data reaches a second threshold or no data left in the memory, wherein the first value is lower than the first threshold, and the second threshold is greater than the first threshold; and
transmitting data received by the USB controller to a host, wherein a transmission bandwidth used for fetching data in the memory is less than a transmission bandwidth between the USB controller and a host.

7. The data transmission method of claim 6, further comprising:
determining the second threshold according to a maximum volume of a single data transmission that is provided by a host.

8. The data transmission method of claim 6, further comprising:
when the data volume of the fetched data fetched from the memory is greater than the second threshold, stopping transmitting the fetched data from the memory to the USB controller, and transmitting a short packet to the USB controller.

9. The data transmission method of claim 6, further comprising:
when there is no data left in the memory, transmitting a short packet to the USB controller.

10. The data transmission method of claim 6, applied to a network adaptor.

11. A universal serial bus (USB) system, comprising:
a host, comprising:
a processor;
a system memory, coupled to the processor; and
a first USB controller, coupled to the system memory; and
a peripheral element, coupled to the host via a USB transmission medium, wherein the peripheral element comprises:
a memory, arranged for receiving and storing external data;
a direct memory access (DMA) engine, coupled to the memory and arranged for controlling data retrieved from the memory; and
a second USB controller, coupled to the DMA engine, the second USB controller arranged for receiving data from the DMA engine, and transmitting the received data to the system memory via the USB transmission medium and the first USB controller;

wherein the DMA engine starts to fetch data from the memory when a data volume of stored data in the memory changes from a first value to a first threshold while in the memory, transmits fetched data to the USB controller until a data volume of the fetched data reaches a second threshold or no data left in the memory, and the first value is lower than the first threshold, and the second threshold is greater than the first threshold;

wherein a transmission bandwidth between the memory and the DMA engine is less than a transmission bandwidth between the USB controller and the host.

12. The USB system of claim 11, wherein when the data volume of the fetched data fetched by the DMA engine from the memory is greater than the second threshold, the DMA engine stops transmitting the fetched data from the memory to the second USB controller, and transmits a short packet to the second USB controller and then the first USB controller; and when the first USB controller receives the short packet, the first USB controller issues an interrupt signal to the processor to notify the processor to read data stored in the system memory.

13. The USB system of claim 11, wherein when the DMA engine determines that there is no data left in the memory, the DMA engine transmits a short packet to the second USB controller and then the first USB controller; and when the first USB controller receives the short packet, the first USB controller issues an interrupt signal to the processor to notify the processor to read data stored in the system memory.

14. The data transmission circuit of claim 11, wherein the peripheral element is a network adaptor.

* * * * *